US 11,428,359 B2

(12) United States Patent
Tiberghien et al.

(10) Patent No.: US 11,428,359 B2
(45) Date of Patent: Aug. 30, 2022

(54) FEMALE ELEMENT AND FLUID CONNECTION

(71) Applicant: STAUBLI FAVERGES, Faverges-Seythenex (FR)

(72) Inventors: Alain-Christophe Tiberghien, Sevrier (FR); Christophe Durieux, Gilly sur Isere (FR); Romain Mayer, Hery sur Ugine (FR)

(73) Assignee: STAUBLI FAVERGES, Faverges-Seythenex (FR)

( * ) Notice: Subject to any disclaimer, the term of this patent is extended or adjusted under 35 U.S.C. 154(b) by 302 days.

(21) Appl. No.: 16/871,308

(22) Filed: May 11, 2020

(65) Prior Publication Data
US 2020/0363000 A1 Nov. 19, 2020

(30) Foreign Application Priority Data
May 14, 2019 (FR) ...................................... 1904996

(51) Int. Cl.
F16L 37/23 (2006.01)
(52) U.S. Cl.
CPC .................... F16L 37/23 (2013.01)
(58) Field of Classification Search
CPC . F16L 37/23; F16L 37/22; F16L 37/34; F16L 37/35; F16L 37/138; F16L 37/40
USPC .......... 285/85, 316, 317, 148.14, 148.21, 33
See application file for complete search history.

(56) References Cited

U.S. PATENT DOCUMENTS

| 2,433,119 | A | | 12/1947 | Hansen | |
|---|---|---|---|---|---|
| 5,230,538 | A | * | 7/1993 | Kobayashi | F16L 37/23 285/321 |
| 5,984,266 | A | * | 11/1999 | Kotake | 285/316 |
| 7,938,456 | B2 | * | 5/2011 | Chambaud | F16L 37/23 285/85 |
| 9,752,713 | B2 | * | 9/2017 | Tiberghien | F16L 37/23 |
| 10,094,502 | B2 | * | 10/2018 | Tiberghien | F16L 37/23 |
| 2005/0087239 | A1 | * | 4/2005 | Kohda | F16L 37/23 |

FOREIGN PATENT DOCUMENTS

EP 3184871 A1 6/2017
FR 2991424 A1 12/2013

OTHER PUBLICATIONS

Search Report for FR 1904996, dated Dec. 16, 2019, 2 Pages.

* cited by examiner

Primary Examiner — Zachary T Dragicevich
Assistant Examiner — William S. Choi

(57) ABSTRACT

A female fluid connection element (5), configured to be coupled with a male element (4). A female body (21), which has an insertion channel (27) of the male element (4); locking elements (31) movable between positions; and a maneuvering ring (71) with an inner sleeve (75) for driving the locking element (31) to their proximal position. In order to have a small bulk and to offer particularly easy and reliable locking and unlocking, the female element (5) has a return plunger (33), returning the locking elements (31) toward their distal position, and a resilient member (43), exerting a return force to bring the return plunger (33) back toward a forward position. By being moved toward its withdrawn position, the maneuvering ring (71) drives the return plunger (33) toward a rear position, such that it does not exert a return force on the locking elements (31).

21 Claims, 10 Drawing Sheets

FEMALE ELEMENT AND FLUID CONNECTION

BACKGROUND OF THE INVENTION

The present invention relates to a female element, for a fluid connection designed for joining pressurized fluid lines, as well as a fluid connection comprising such a female element.

The invention in particular relates to the field of quick connections, for connecting heat transfer fluid pipes designed for cooling computer server facilities, or similar electronic or electrotechnical systems.

The connection of a pipe for supplying a computer bay with cooling liquid requires coupling one or several connections, in order to produce circuits and/or loops for distributing the cooling liquid. Each connection is made up of a male element, which is attached on the bay side, and a female element, on the supply side, the male element being coupled to a cooling pipe and the female element being coupled to a supply pipe.

In general, the connections are connected manually, which may require a substantial installation and uninstallation time. Thus, when the profile of the male element allows it, a female element with locking balls is generally provided, in order to form an automatic connection with the male element, called "quick connection". This type of quick connection typically satisfies this use while allowing an easier connection. However, this type of connection may have certain drawbacks in terms of bulk or disconnection manipulation.

FR 2,991,424 A1 describes a female connection endpiece with locking balls, which comprises a movable ring in the main body of the female endpiece, to release locking balls or to keep them in an unlocked position. However, due to the radial contact and maintenance of the movable ring on the locking elements, the travel of the ring is significant and requires providing a relatively long annular space within the main body of the female endpiece. As a result, this known female endpiece is relatively bulky in the axial direction and in the radial direction.

U.S. Pat. No. 2,433,119 describes a female connection member, made up of a body with cylindrical housings that are inclined relative to the axis of the female connection member. A hollow cylindrical roller is provided in each of these cylindrical housings, able to cooperate with an inclined shoulder of the male member, with the aim of keeping the male and female members in a coupled relationship. Each roller is pushed back toward the axis of the female member by an individual spring, to keep the roller bearing against an inclined end of an inner sleeve, belonging to a sleeve assembly, and cooperating with the inclined shoulder of the male member. By pulling on the sleeve assembly, the rollers are driven toward the outside by the inner sleeve, to unlock the male member.

However, this known female connection member has many drawbacks. The individual action of each spring on its respective hollow cylinder makes the locking and unlocking uncertain and potentially physically difficult, inasmuch as each hollow cylinder and/or its respective spring may become jammed in the cylindrical housing in question, by bracing, surface pollution, and/or wearing of the parts. In this known female connection member, the arrangement of the parts further has a relatively substantial radial bulk.

BRIEF SUMMARY OF THE INVENTION

The invention aims to address the drawbacks of the prior art by proposing a new female element that, while having a particularly small bulk, offers particularly reliable and easier locking and unlocking.

The invention relates to a female element, for a fluid connection designed for joining pressurized fluid lines, the female element being configured to be coupled with a complementary male element, belonging to the fluid connection, the female element comprising:
- a female body, defining an insertion channel of the male element, the insertion channel defining a central axis of the female body;
- locking elements, which are received in respective housings arranged in the thickness of the female body, each housing being inclined relative to the central axis and emerging in the insertion channel, each locking element being movable relative to the female body, between a distal position, in which said locking element protrudes radially into the insertion channel, and a proximal position, in which said locking element is withdrawn from the insertion channel; and
- a maneuvering ring, which surrounds the female body and which is translatable relative to the female body along the central axis, between a forward position and a withdrawn position, the maneuvering ring comprising an inner sleeve that is at least partially received in the insertion channel, the inner sleeve being configured to:
    - drive the locking elements to their proximal position, when the maneuvering ring is moved from its forward position to its withdrawn position,
    - prevent the locking elements from adopting their distal position when the maneuvering ring is in the withdrawn position, and
    - allow the locking elements to adopt their distal position when the maneuvering ring is in the forward position.

According to the invention:
- the female element further comprises:
    - a return plunger, which is inserted radially between the maneuvering ring and the female body, which is movable relative to the female body and which is intended to return the locking elements toward their distal position, the return plunger being movable between a forward position, in which the locking elements are in their distal position, and a rear position, in which the return plunger leaves the locking elements freely movable between their distal position and their proximal position, and
    - a resilient member, which exerts a return force tending to return the return plunger toward its forward position; and
- the maneuvering ring is configured to drive the return plunger toward its rear position, such that the return plunger does not exert any return force on the locking elements when the maneuvering ring is moved from its forward position toward its withdrawn position.

One idea at the base of the invention is to provide that the return force generated by the resilient member is transmitted to the locking elements by means of the return plunger. In other words, the return plunger serves as force transmitting means. Since the return force is transmitted by the return plunger, it is advantageously possible to provide that the resilient member is oriented parallel to the central axis, such that the female element is radially compact. Owing to the invention, it is advantageously possible to conceive that the return plunger is pushed back only by the resilient member, which in turn is made up of a single spring. The production of the female element is then made easier, by reducing the number of parts, and the bulk is reduced. Furthermore, the only resilient member can be more easily designed to have greater resistance to wear, compared to a plurality of smaller individual resilient members. During the use of the female element according to the invention, the presence of the return plunger advantageously makes it possible to provide that the maneuvering ring drives the return plunger away from the locking elements when the maneuvering ring is moved toward its rear position, such that the return plunger no longer applies the return force on the locking elements during the unlocking, this return force then preferably being reacted by the maneuvering ring. It would be possible to provide that this return force is reacted by a part other than the maneuvering ring itself. The return plunger not exerting the return force on the locking elements during the unlocking, the locking elements are relieved of the return force and do not risk becoming jammed in their respective housings. Additionally, the direct withdrawal of the return plunger frees the friction components of the locking elements if they were subject to the return force of the ring at the stage of the unlocking maneuver. The wear of the locking elements and the housings is reduced as a result.

The unlocking of the female element is then particularly reliable and easy. Furthermore, the resilient member advantageously applying a purely axial force, the force to be applied on the maneuvering ring to perform the unlocking is smaller, compared to the prior art, where inclined resilient members were provided. The locking elements and the housings being kept in good condition, the locking is also particularly reliable and easy.

Preferred features of the invention are defined hereinafter:
- the maneuvering ring is configured to drive the return plunger toward its rear position, away from the locking elements, when the maneuvering ring is moved from its forward position toward its withdrawn position.
- the return plunger is a return ring that is translatable relative to the female body, along the central axis, and designed to return the locking elements toward their distal position under the action of the return force when the return ring bears against the locking elements.
- the female body constitutes a stop of the return plunger in its forward position.
- the inner sleeve comprises a proximal wall, by means of which the inner sleeve drives the locking elements from their distal position to their proximal position, when the maneuvering ring is moved from its forward position to its withdrawn position.
- the return plunger comprises an inclined front face, by means of which the return plunger is able to abut against the locking elements.
- the inclined front face or the proximal wall is kept at a distance from the locking elements, so as to allow a movement of the locking elements between the inclined front face and the proximal wall when the maneuvering ring is moved from its forward position to its withdrawn position.
- the proximal wall is inclined relative to the central axis, by an angle of between 20 degrees and 70 degrees, preferably equal to 45 degrees.
- each locking element is movable between its proximal position and its distal position along a respective movement axis, which is inclined relative to the central axis, by an angle between 20 degrees and 70 degrees, preferably equal to 45 degrees.
- the locking elements bear on the inner sleeve, when the locking elements are in the distal position.
- each locking element bears on a respective annular stop of the female body, when said locking element is in the distal position.
- the return plunger is configured to bear against the maneuvering ring, the return plunger tending to return the maneuvering ring toward the forward position under the action of the return force, when the return plunger bears against the maneuvering ring.
- the inner sleeve forms a front inner wall, of cylindrical shape centered on the central axis.
- the female body forms a rear inner wall, delimiting a part of the insertion channel, the rear inner wall being of cylindrical shape centered on the central axis.
- the front inner wall and the rear inner wall are of equal diameter and are arranged in the extension of one another.
- each locking element is formed by a respective ball.
- each locking element is formed by a respective cylindrical roller.
- the female element comprises: a central piston, arranged inside the insertion channel while being stationary with respect to the female body, the central piston having a first front face; and a closing slide valve, radially inserted between the insertion channel and the central piston, while being movable relative to the female body between a forward position, in which the closing slide valve fluidly closes the insertion channel, and a withdrawn position, in which the closing slide valve fluidly frees the insertion channel, the closing slide valve having a second front face, the first front face and the second front face extending in a same plane perpendicular to the central axis when the closing slide valve is in the forward position.

The invention also relates to a fluid connection, designed to join pressurized fluid lines, the fluid connection comprising a female element according to the preceding and a complementary male element, with which the female element is configured to be coupled, the male element comprising a male body that is able to be received in the insertion channel of the female body through the inner sleeve, to push the locking elements into their proximal position when the male body is received in the insertion channel, and to cooperate with the locking elements when the locking elements are in the distal position, to prevent the axial removal of the male body from the insertion channel.

Preferred features of the invention are defined hereinafter:
- the male body comprises a first surface, able to push the locking elements back into their proximal position when the male element is received in the insertion channel of the female body, the first surface preferably having a conical shape converging toward the front of the male element.
- the male body comprises a second surface, able to cooperate with the locking elements, while the locking elements are in the distal position, to prevent the axial removal of the male body from the insertion channel, the second surface preferably being inclined by an angle of between 20 degrees and 70 degrees, for example equal to 45 degrees, relative to a central axis of the male element defined along the male body, the central axis of the male element and the central axis of the female element being coaxial when the male body is received in the insertion channel of the female body.

the male body comprises a flange ring, the first surface being formed in front of the flange ring, the second surface being formed behind the flange ring.

wherein the second surface of the male body and the proximal wall of the inner sleeve of the female element are inclined relative to the central axis of their respective male or female element, by an equal angle, this angle preferably being equal to 45 degrees.

BRIEF DESCRIPTION OF THE DRAWINGS

Other features of the invention will emerge in more detail from the following description, presenting preferential but non-limiting embodiments of the invention, this description referring to the appended drawings listed below.

DETAILED DESCRIPTION OF THE INVENTION

FIGS. 1 to 6 show a fluid connection according to a first embodiment. The connection is designed to join a pressurized fluid line 1, and a pressurized fluid line 2, shown in broken lines in FIG. 1. The pressurized fluid is for example a heat transfer liquid.

Figure 1:
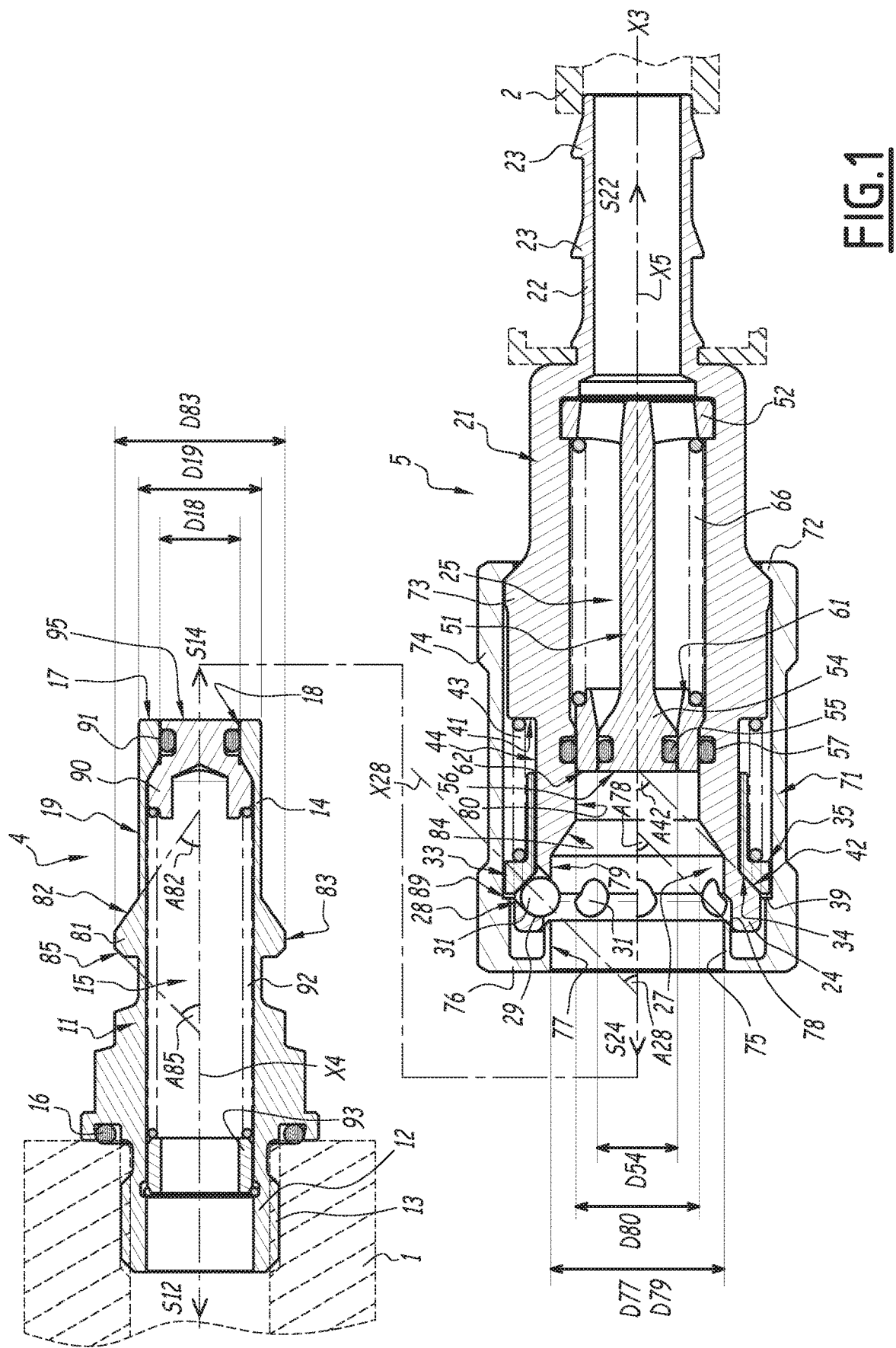
FIG. 1 shows a connection according to a first embodiment according to the invention, the connection being in an uncoupled configuration and comprising a male element and a female element defining a central axis, where the male element is shown in section along a radial plane and where the female element is shown, above the central axis, in section in a first radial section plane, and, below the central axis, in section in a second radial section plane perpendicular to the first radial section plane.
Figure 4:
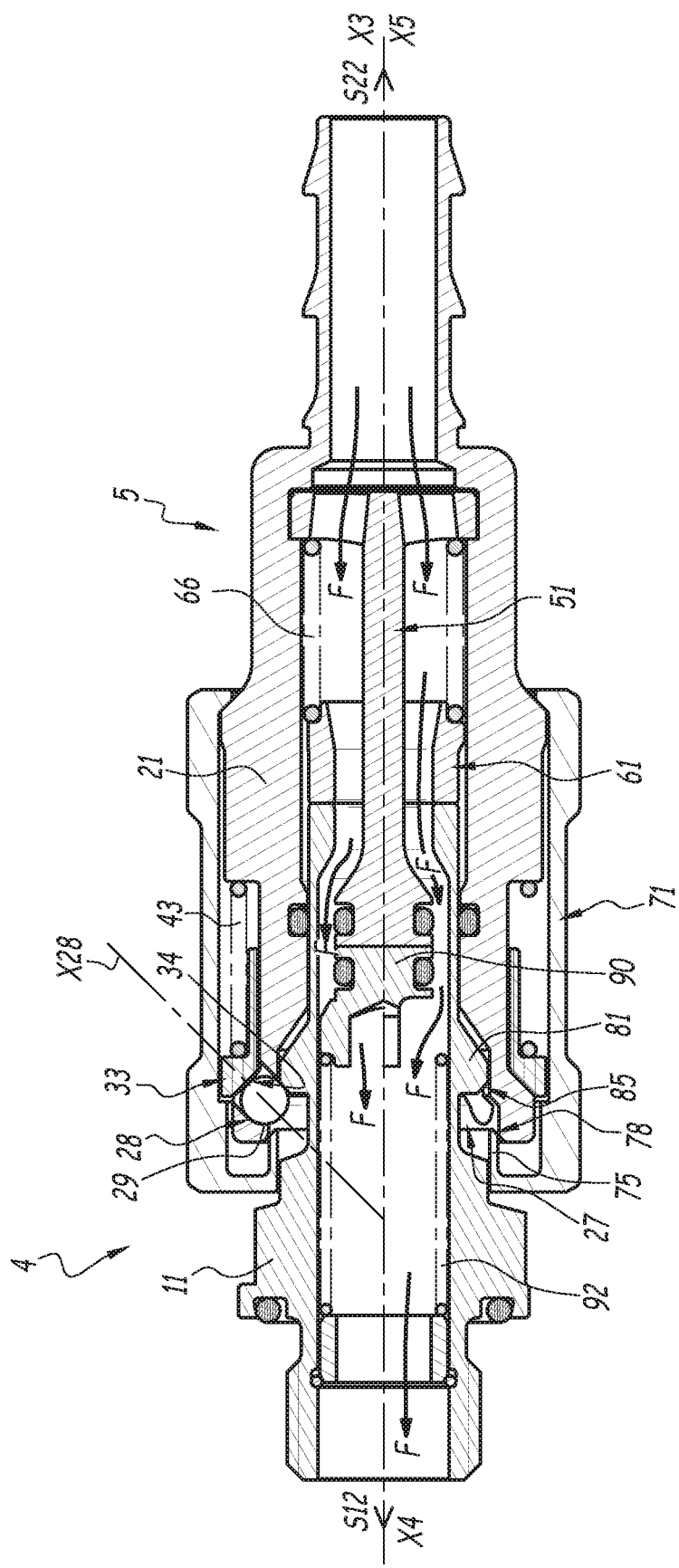
FIG. 4 is a view similar to FIG. 3, where the connection of FIG. 1 is in a second stage of coupling successive to the first stage of coupling.

The fluid connection comprises a male element 4, or male endpiece, and a female element 5, which are complementary and which are both coaxial with the central axis X3 of the connection, when the elements 4 and 5 are in a coupled configuration, as shown in FIG. 4. The male element 4 and the female element 5 each define a respective central axis X4 and X5, which is combined with the central axis X3 when the elements 4 and 5 are in the coupled configuration. In FIG. 1, the elements 4 and 5 are shown in an uncoupled configuration.

In the coupled configuration, the pressurized fluid delivered by the line 2 circulates within the female element 5, then the male element 4, to be received by the line 1, parallel to the central axis X3, as shown by the arrows F of FIG. 4. The connection can be used in a configuration where the fluid circulates in the opposite direction. In the uncoupled configuration, the male element 4 closes off the line 1 and the female element 5 closes off the line 2, such that the circulation of the fluid is interrupted and does not leak through the ends of the lines 1 and 2.

It is advantageously provided for the male element 4 to belong to a receiving installation, for example a computer bay, toward which the fluid must be conveyed, or from which the fluid must be extracted. It would on the contrary be possible for the female element 5 to belong to this receiving installation.

The male element 4 comprises a tubular male body 11, coaxial with the axis X4. The body 11 is advantageously monolithic.

Along this axis X4, the male body 11 comprises a rear end part 12, designed to be connected to the line 1, for example by screwing of the line 1 on an outer thread 13 of the part 12. The tightness between the male body 11 and the line 1 is advantageously obtained owing to a gasket 16 of the male element 4, borne by the body 11. The male body 11 comprises a front end part 14, designed to be received by the female body 5 in the coupled configuration. The male element 4 defines a front direction S14, parallel to the axis X4, going from the part 12 to the part 14, and a rear direction S12, in the opposite sense.

The male body 11 defines an inner pipe 15 for the circulation of the fluid, the pipe 15 being coaxial with the axis X4, emerging at the end part 12 in the direction S12, if applicable, in the pipe 1, and emerging at the end part 14 in the direction S14, if applicable, in the female element 5.

The female element 5 comprises a tubular female body 21, coaxial with the axis X5. The body 21 is advantageously monolithic.

Along this axis X5, the female body 21 comprises a rear end part 22, or rear tail, designed to be connected to the line 2, for example by fitting of the line 2 on a series of notches 23 of the part 22. The female body 21 comprises a front end part 24, designed to receive the male element 4, in the coupled configuration, in particular the male body 11. The female element 5 defines a front direction S24, parallel to the axis X5, going from the part 22 to the part 24, and a rear direction S22, in the opposite sense.

The body 21 defines an inner pipe 25 for the circulation of the fluid, the pipe 25 being coaxial with the axis X5, emerging at the end part 22 in the direction S22, if applicable, in the pipe 2, and emerging at the end part 24 in the direction S24, if applicable, in the female element 5.

In particular, a part of the inner pipe 25, extending in the direction S22 from the mouth of the end part 24 of the pipe 25, forms an insertion channel 27, where the part 14 of the male body 11 is received when the connection is in the coupled configuration, as shown in FIG. 4. The axis X5 is defined by this channel 27, which is coaxial thereto.

Preferably, the female element 5 comprises a central piston 51, which is arranged, at least partially, inside the insertion channel 27, axially at a cylindrical wall 80 of the female body 21 partially delimiting the channel 27. The piston 51 comprises a rear base 52, by means of which the piston 51 is attached, for example by screwing, to the female body, such that the piston 51 is stationary relative to the female body 21. The rear base 52 is passed through by different openings emerging in the direction S24 and S22, in order to guarantee the continuity of the passage of fluid through the inner pipe 25. The central piston 51 comprises a front head 54, centered on the axis X5, advantageously bearing a peripheral sealing gasket 55 and having a front face 56, which here extends in a plane orthogonal to the axis X5 and is oriented in the direction S24. An annular space coaxial with the axis X5 is arranged radially between the channel 27 on the one hand, in particular a sealing gasket 57 of the female element 5 carried by the cylindrical wall 80 of the channel 27, and the head 54 on the other hand, in particular the sealing gasket 55 carried by the head, to allow the passage of the fluid in the coupled configuration of the connection. The gaskets 55 and 57 are advantageously arranged in a same plane perpendicular to the axis X5, while being coaxial.

The female element 5 comprises a closing slide valve 61, which has an annular shape and is radially arranged around the central piston 51. The slide valve 61 is movable parallel to the axis X5 relative to the female body 21, between a forward position shown in FIG. 1, in which the closing slide valve 61 fluidly closes off the insertion channel 27 while closing off the annular space by cooperation with the gaskets 55 and 57, and a withdrawn position, in which the closing slide valve 61 fluidly frees the insertion channel 27 while being offset in the direction S22 relative to the head 54 of the piston 51. At least for its forward position, the closing slide valve 61 is inserted between the insertion channel 27 and the central piston 51. The closing slide valve 61 has a front face 62 that extends in the same plane perpendicular to the central axis X5 as the front face 56 as the face when the closing slide valve 61 is in the forward position, such that the female element 5 can be described as planar connection face. The female element 5 comprises a resilient member 66 that exerts a force returning the slide valve 61 toward the forward position. The member 66 is advantageously arranged in the inner pipe 25, while being axially inserted between the closing slide valve 61 and the base 52 of the piston 51.

The female body 21 defines a plurality of housings 28, which are arranged in the thickness of the front end part 24 of the female body 21 while being distributed, preferably evenly, about the central axis X5, in a same plane orthogonal to the axis X5. Each housing 28 is a through housing, emerging on the one hand in the channel 27 and on the other hand outside the body 21.

The female element 5 comprises locking elements 31, here six locking elements 31, which for example each assume the form of a ball. Each locking element 31 is individually received in one of the housings 28. Each locking element 31 is movable relative to the female body 21, while being guided by its respective housing 28 along a respective movement axis X28. The housings 28 are inclined relative to the central axis X5, that is to say, each housing 28 is molded to guide its element 31 along an axis X28 that is comprised in a respective plane comprising the axis X5, the axis X28 being neither radial nor axial with respect to the axis X5. The axes X28 of the housings 28 are concurrent at a same point of the axis X5. Preferably, each housing 28 is partially cylindrical coaxial to the axis X28 in order to guide the element 31. Each axis X28 is inclined by an angle A28 relative to the axis X5, of between 20 degrees and 70 degrees, preferably equal to 45 degrees. Along its respective axis X28, each element 31 is movable relative to the body 21 between a distal position shown in FIGS. 1 and 4, where the element 31 is moved both in the direction S24 and also radially toward the axis X5, and a proximal position shown in FIGS. 3 and 6, where the element 31 is moved both in the direction S22 and away from the axis X5.

In the distal position, the locking element 31 protrudes radially into the channel 27. For each locking element 31, the distal position preferably corresponds to a range of motion of the locking element 31 relative to the female body 21 along the axis X28 in question, where the locking element 31 protrudes radially into the channel 27. In the embodiment of FIGS. 1 to 6, when it is in the distal position, each locking element 31 is bounded in its movement in the direction S24 against a respective annular stop 29 of the female body 21, here formed at one end of the housing 28 receiving said element 31. The annular stop 29 for example takes the form of a progressive reduction in diameter of the housing 28 along the axis X28 toward the axis X5, extending the end of its cylindrical shape. In the distal position, the element 31 protrudes into the channel 25 through the annular stop 29.

In a variant, it is provided that each housing 28 is devoid of stop 29, the locking element 31 abutting in the direction S24, in the distal position, against another part of the female element 5, as is for example described hereinafter for the embodiment of FIGS. 7 to 10.

In the proximal position, the locking element 31 is withdrawn from the insertion channel 27, that is to say, it is retracted into its housing 28 so as not to protrude into the insertion channel 27. In a variant, it is provided that, in the proximal position, the locking element 31 protrudes into the insertion channel 27, but less than in the distal position.

The female element 5 comprises a return plunger 33, which here assumes the form of a return ring coaxial with the axis X5, surrounding the front end part 24 of the female body 21. The plunger 33 is advantageously monolithic. The plunger 33 is mounted translatably relative to the female body 21, parallel to the axis X5, while being guided by sliding of the plunger 33 along an outer radial wall 44 of the female body 21, the wall 44 extending in the direction S22 from the housings 28. The plunger 33 is movable between a forward position in the direction S24, shown in FIGS. 1 and 4, and a rear position in the direction S22, shown in FIG. 6.

Figure 6:
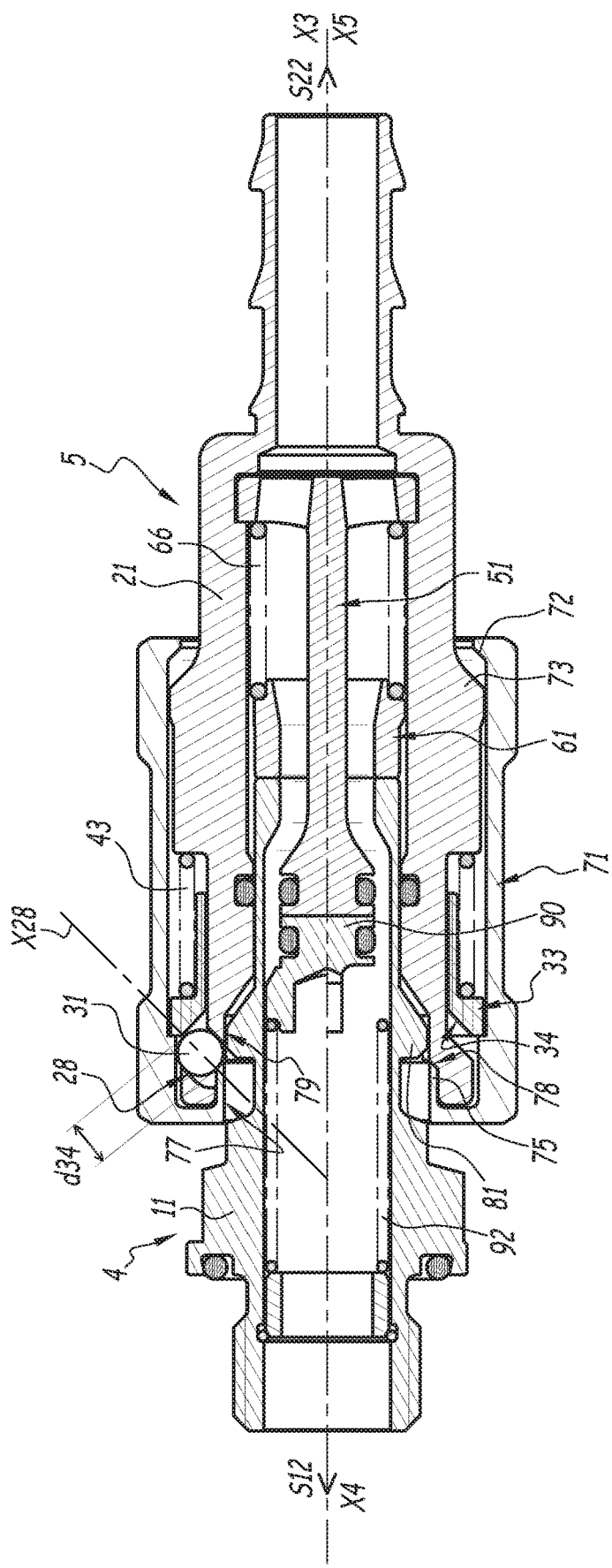
FIG. 6 is a view similar to FIG. 5, where the connection of FIG. 1 is in a second stage of uncoupling successive to the first stage of uncoupling.

In the rear position of FIG. 6, the plunger 33 leaves the locking elements 31 freely movable between their distal and proximal positions. In particular, in its movement toward the rear and by its separation from its forward position, the plunger 33 has freed a space along the axis X28, which allows each locking element 31 to translate in its respective housing 28 along the axis X28.

The female body 21 forms a front stop of the plunger 33, in the forward position. This front stop is here formed by an inclined front shoulder 42 of the body 21, positioned at a front end of the wall 44 and oriented in the direction S22, while being inclined relative to the axis X5 with an angle A42, such that the surface of the shoulder 42 is perpendicular to the axes X28 defined by the housings 28. The angle A42 is preferably between 20 and 70 degrees, here 45 degrees. To bear in the direction S24 against the shoulder 42, the plunger 33 comprises an inclined front face 34, which is complementary with the inclined front shoulder 42 and abuts against the shoulder 42. The inclined front face 34 is conical and is inclined relative to the axis X5 by an angle [equal] with the angle A42. Preferably, the inclined front face 34 is oriented perpendicular to the axes X28.

The housings 28 are advantageously arranged from the surface of the shoulder 42, preferably such that, in the proximal position, the locking elements 31 protrude from the surface of the shoulder 42. In the forward position of the return plunger 33, the face 34 of the plunger 33 arrives against the mouth of the housings 28 so as to keep the locking elements 31 inside their respective housing 28, in the distal position. In this situation, each element 31 can move freely relative to the female body 21, along the axis X28, between the annular stop 29 of the housing 28 in question, and the face 34 of the plunger 33. Thus, even when the plunger 33 is in the forward position, travel play, that is to say, a movement range, is advantageously arranged for each locking element 31. When the plunger 33 is in the forward position, the locking elements 31 are in the distal position. It is advantageously provided that the annular stop 29 is perpendicular to the axis X28 and the face 34 of the plunger 33.

In a variant, it is possible to provide that the abutment in the forward position of the plunger 33 and the bearing of the plunger 33 against the elements 31 are provided by two separate surfaces belonging to the plunger 33. It is also possible to provide that the female body 21 comprises two separate surfaces for receiving the plunger 33 by abutment in the forward position and forming the proximal mouth of the housings 28.

The female element 5 comprises a resilient member 43, which is preferably formed by a single helical spring coaxial with the axis X5. The member 43 is advantageously arranged radially around the female body 21. The member 43 is axially inserted between, on the one hand, the female body 21, for example by bearing on an axial shoulder 41, oriented in the direction S24 and positioned at a rear end of the wall 44, or on another part of the female body 21, and, on the other hand, the plunger 33, in particular an axial shoulder 35 of the plunger 33. The resilient member 43 exerts a resilient return force on the plunger 33, while bearing on the female body 21, so as to push the plunger 33 back toward its forward position. The plunger 33 can abut, that is to say, bear, in the direction S24, via the inclined front face 34, against the locking elements 31. If the plunger 33 forms a ring, the return force supplied by the member 43 is advantageously distributed uniformly to the locking elements 31. When the plunger 33 bears against the locking elements 31 in the direction S24, the plunger 33 transmits the return force from the member 43 to the locking elements 31, which tends to return the locking elements 31 to the distal position. In the present example, the plunger 33 serves as angle transmission, by applying a force parallel to the axis X28 on the locking element 31, owing to the incline of the face 34, which is perpendicular to the axis X28, while the return force supplied by the member 43 is parallel to the axis X5. The wear of the housings 28 and the locking elements 31 is therefore reduced, as well as the risk of blocking of the elements 31. The distal position of the locking elements 31 corresponding to a situation where the locking elements 31 can travel between the stop 29 and the shoulder 42, the risk of jamming of each locking element 31 in the annular stop 29 is also reduced.

A single member 43 and a single plunger 33 ensuring the return of all of the locking elements 31, the number of parts is reduced and their assembly is reduced. In a variant, it is nevertheless possible to provide that the plunger 33 comprises, instead of a single ring, a plurality of fingers individually translatable parallel to the axis X5 relative to the female body 21, all of the fingers being distributed around the axis X5 and pushed back by the member 43, and each finger being configured to return a single one of the locking elements 31 toward its distal position.

In the case where a single resilient member 43 is provided, the distribution of the return force by the plunger 33 to all of the locking elements 31 makes it possible to ensure that, if only one of the locking elements 31 becomes jammed in its housing 28, the return force is sufficient to release it. In the case of the variant where the plunger 33 assumes the form of individual fingers, the other locking elements 31 are returned to the distal position even if one of the fingers is jammed, such that the locking of the connection can nevertheless be provided.

The female element 5 comprises a maneuvering ring 71, designed to be actuated by a user. The ring 71 is advantageously monolithicmonolithic. The ring 71 comprises a tubular outer part 74, which surrounds the front end part 24 of the female body 21, the return plunger 33 and the resilient member 43. The plunger 33 and the member 43 are therefore radially inserted between the female body 21 and the maneuvering ring 71, in particular the tubular part 74, while being completely covered by the part 74.

The ring 71 slides over the female body 21 parallel to the axis X5, so as to be translatable relative to the female body 21 along the axis X5. In the direction S24, the translation of the ring 71 is bounded in a forward position, shown in FIGS. 1 to 4, by abutment of the ring 71 against the female body 21, in particular by abutment of an inner conical shoulder 72 of the ring 71, for example carried at a rear end of the part 74 of the ring 71, against a corresponding outer conical shoulder 73 of the female body 21. In the direction S22, the ring 71 can translate to a withdrawn position relative to the female body 21, shown in FIG. 6.

The maneuvering ring 71 comprises an inner sleeve 75, which is at least partially received in the insertion channel 27. The inner sleeve 75 is fixedly secured to the tubular part 74. Preferably, the inner sleeve 75 is attached to the outer tubular part 74 by means of a front wall 76 of the ring 71, of annular shape, the front wall 76 being arranged in the direction S24 relative to the front end part 24 of the female body 21. Thus, the maneuvering ring 71 has, at the front end of the outer tubular part 74, a part that is curved toward the inside of the female body 21, made up of the inner sleeve 75 and the front wall 76. The inner sleeve 75 advantageously forms a mouth of the female element 5, by means of which the male element 4 can be received in the female body 21. The front wall 76 in turn advantageously extends in a plane orthogonal to the axis X5.

Preferably, the inner sleeve 75 forms an inner wall 77, called "front inner wall", of cylindrical shape coaxial to the axis X5. The wall 77 extends from the front end of the ring 71, to a proximal wall 78 of the inner sleeve 75, making up a rear end of the inner sleeve 75.

The female body 21 forms an inner wall 79, called "rear inner wall", which delimits a part of the insertion channel 27. The wall 79 is arranged in the direction S24 relative to the wall 80. The rear inner wall 79 is cylindrical, coaxial with the central axis X5, and extends in the direction S22 from the mouth of the housing at 28 in the channel 27. The rear inner wall 79 has diameter D79, which is advantageously greater than a diameter D80 of the wall 80. A diameter D77 of the front inner wall 77 [is] advantageously equal to the diameter D79 of the rear inner wall 79. The walls 77 and 79 are preferably arranged in the extension of one another along the axis X5, the wall 79 being in the direction S22 relative to the wall 77. In the withdrawn position of the ring 71, the walls 77 and 79 advantageously arrange slight axial play between them, as shown in FIG. 6, whereas in the forward position of the ring 71, the walls 77 and 79 are axially further apart, as shown in FIGS. 1 to 4. As shown in FIGS. 1 to 4, in the forward position of the maneuvering ring 71 and in the distal position of the locking elements 31, the locking elements 31 radially protrude into the channel 25 while protruding radially toward the inside of the walls 77 and 79, and while being axially arranged between the walls 77 and 79.

The proximal wall 78 is advantageously inclined relative to the axis X5, by an angle A78, which is between 20 degrees and 70 degrees, preferably 45 degrees. The proximal wall 78 is therefore conical. It can be provided that the proximal wall 78 is perpendicular to the axes X28 and parallel to the inclined front face 34 of the plunger 33. The maneuvering ring 71 is configured to drive the locking elements 31 from their distal position to their proximal position by causing the proximal wall 78 to bear on the inner sleeve 75, when the maneuvering ring 71 is moved from its forward position to its withdrawn position. The proximal wall 78 thus serves as angle transmission to convert an axial force, oriented along the direction S22 and applied on the ring 71 by a user, into a driving force of each locking element 31 toward its proximal position, parallel to its respective axis X28. The incline of the proximal wall 78 thus avoids the jamming and wear of the elements 31 along the housings 28 when the ring 71 is actuated.

As shown in FIG. 6, by means of the proximal wall 78 of the inner sleeve 75, the maneuvering ring 71 prevents the locking elements from adopting their distal position when the maneuvering ring 71 is in the withdrawn position. Here, the withdrawn position of the ring 71 keeps the elements 31 in the proximal position. As shown in FIGS. 1 to 4, when the locking elements 31 are in the distal position and the maneuvering ring 71 is in the forward position, the locking elements 31 are advantageously at a distance from the proximal wall 78. More generally, placing the maneuvering ring 71 in the forward position allows the locking elements to adopt their distal position, since the proximal wall 78 is in the direction S24 relative to this distal position.

Figure 5:
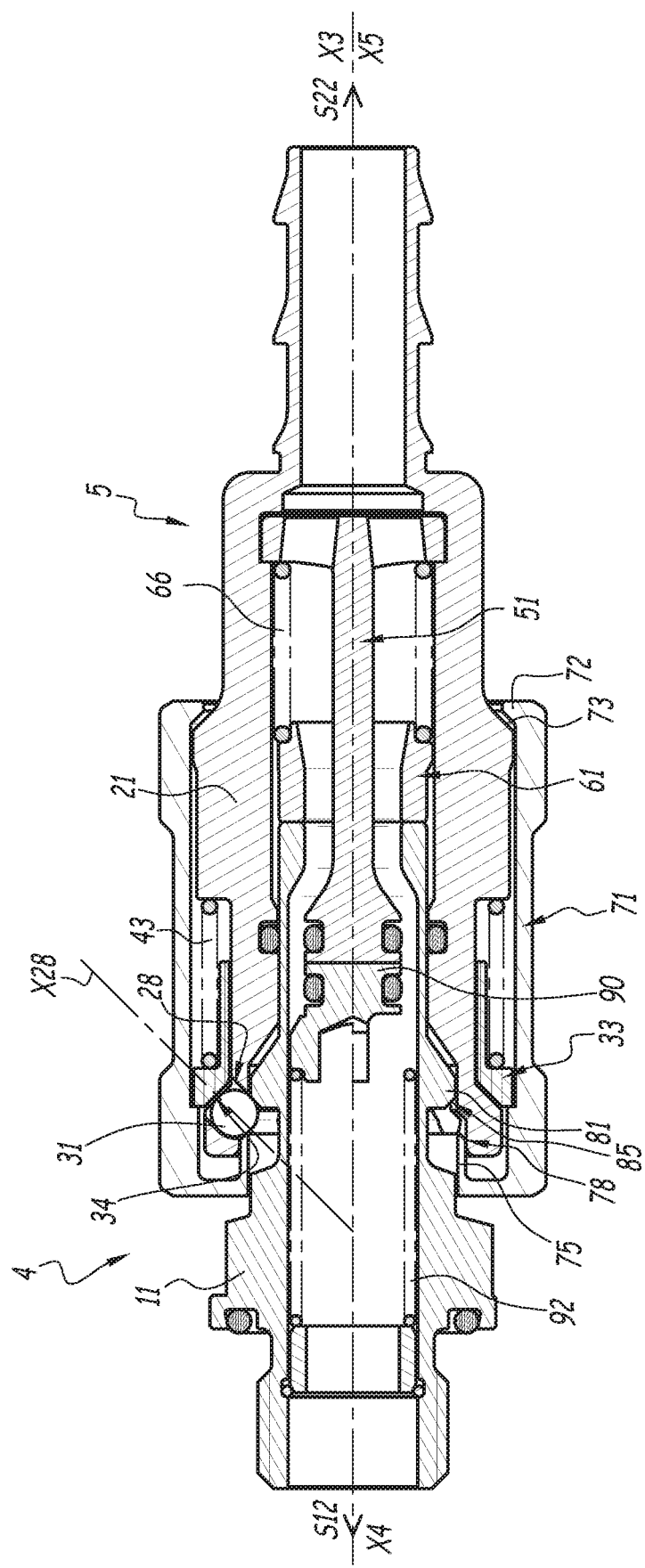
FIG. 5 is a view similar to FIGS. 2 to 4, where the connection of FIG. 1 is in a first stage of uncoupling.

As shown in FIGS. 1 to 4, the maneuvering ring 71, in particular the outer tubular part 74, includes a rear inner shoulder 89, oriented in the direction S22, which, in the forward position of the maneuvering ring 71, is at a distance from a front end face 39 of the plunger 33, the face 39 being formed around the face 34 and facing toward the direction S24. As shown in FIGS. 5 and 6, when the ring 71 is moved from the forward position to the withdrawn position, the ring 71 bears against the plunger 33, in particular by axial bearing of the shoulder 89 against the face 39. In its movement toward the withdrawn position, the ring 71 drives the plunger 33 toward its rear position, against the return force imparted by the member 43. In this situation, the locking elements 31 are relieved of the return force imparted by the member 43, this force being transmitted by the plunger 33 to the maneuvering ring 71. In other words, when the maneuvering ring 71 is moved toward the withdrawn position, no return force is applied on the locking elements 31, since the maneuvering ring 71 drives the return plunger 33 toward the rear, away from the locking elements 31.

Reciprocally, the plunger 33 tends to return the ring 71 toward its forward position, in particular when the ring 71 is in the withdrawn position, under the action of the return force imparted by the member 43, by bearing in the direction S24 of the plunger 33 against the ring 71, via the face 39 and the shoulder 89. The resilient member 43 performing, by itself, in turn, a return function of the locking elements 31 and a return function of the maneuvering ring 71, the number of parts of the female element 5 is particularly reduced and the assembly is made easier, since it is not necessary to provide two separate springs to perform these two return functions.

In other words, in this maneuver, each locking element 31 cannot simultaneously be in contact with the return plunger 33 and the maneuvering ring 71, such that, the locking elements 31 being free with travel play along the axis X28 in their housing, however small it may be, the return plunger 33 cannot exert return force on the locking elements 31. For any configuration of the female element 5, and in particular when the maneuvering ring 71 bears in the direction S22 against the plunger 33, the proximal wall 78 of the inner sleeve 75 [is] at a sufficient distance from the inclined front face 34 of the plunger 33, to allow travel of the locking elements 31, along their respective axis X28, between the proximal wall 78 and the inclined front face 34. In other words, when the maneuvering ring 71 is moved toward the withdrawn position, the dimension of the maneuvering ring 71, the return plunger 33, bearing against the maneuvering ring 71, and the size of the locking element 31 in question are such that a free travel of the locking element 31 in its housing 28 is practicable. Put differently, in this situation, each element 31 can only be in contact with a single surface among the wall 78 and the face 34, while being able to move freely to the other of these two surfaces. The inclined front face 34 or the proximal wall 78 is therefore kept at a distance from the locking elements 31, in order to allow a movement of the locking elements 31 between the inclined face 34 and the proximal wall 78 when the maneuvering ring 71 is moved from its forward position to its withdrawn position. Thus, the risk of jamming of the elements 31 is reduced upon unlocking of the connection, since the elements 31 are not compressed between the ring 71 and the plunger 33, and therefore do not experience the return force of the resilient member 43. As shown in FIG. 6, it is provided that, at least locally at each locking element 31, a minimum distance d34 between the proximal wall 78 and the inclined front face 34, measured along the axis X28, is always greater than the size of the locking element 31 in question measured along the axis X28, here the diameter of the ball forming the locking element 31. In other words, the locking elements 31 are able to be in contact with the maneuvering ring 71 and are kept separated from the return plunger 33 when the maneuvering ring 71 is moved from its forward position to its withdrawn position. This condition stays verified when the plunger 33 is abutting against the shoulder 89 of the ring 71.

Figure 2:
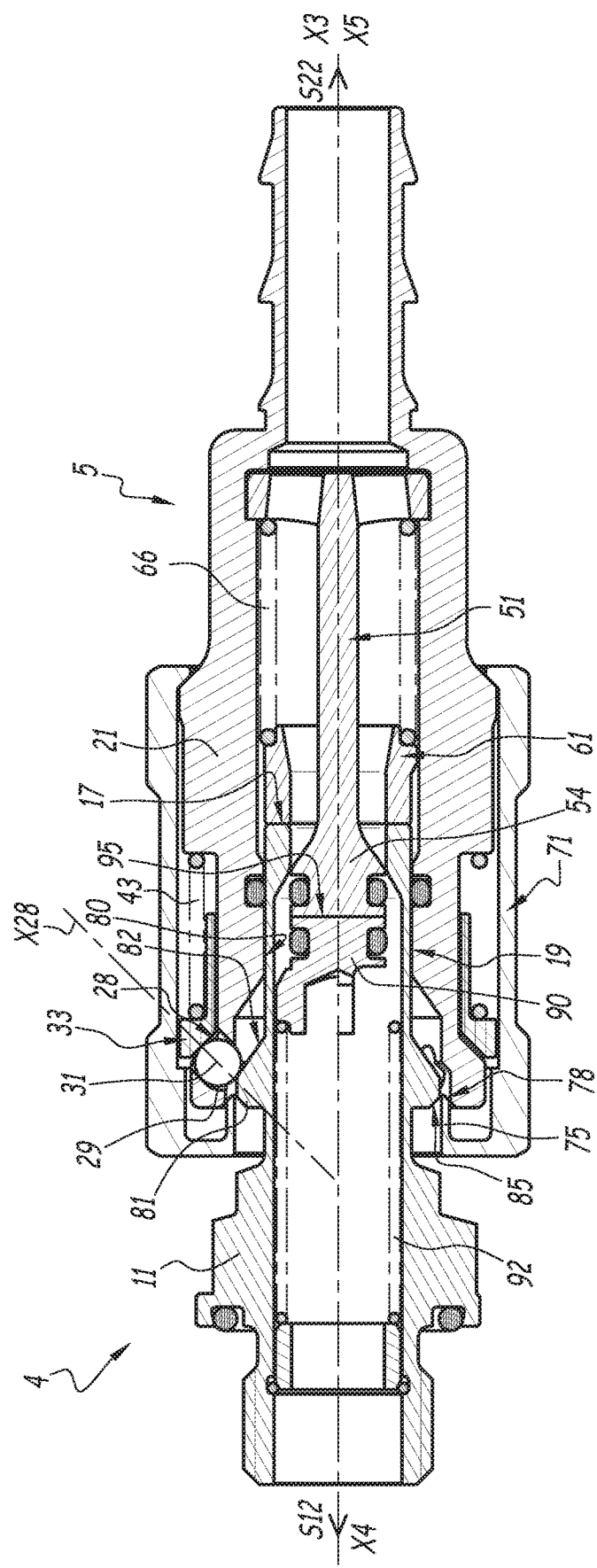
FIG. 2 shows the connection of FIG. 1 in a first stage of coupling, in section in the first section plane above the central axis and in section in the second section plane below the central axis.
Figure 3:
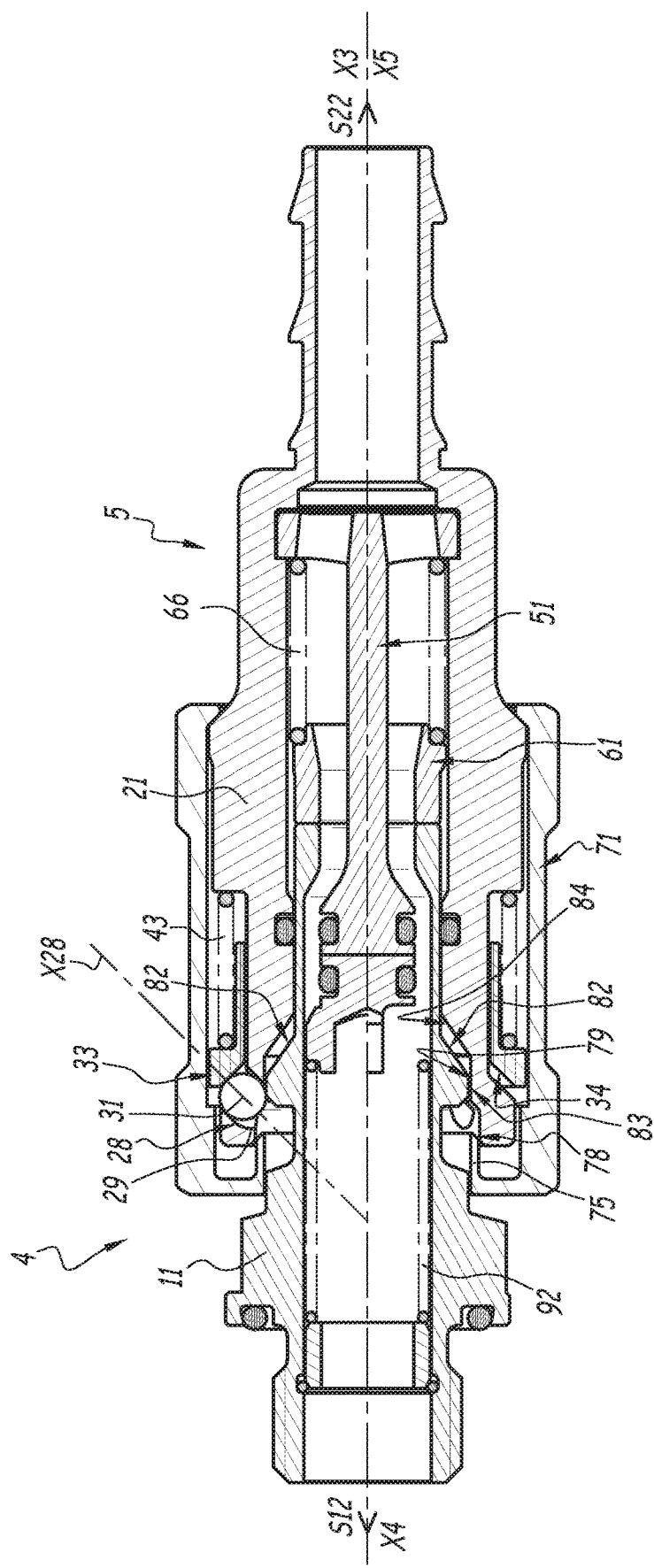
FIG. 3 is a view similar to FIG. 2, where the connection of FIG. 1 is in the second stage of coupling successive to the first stage of coupling.

During the coupling of the male element 4 with the female element 5, the male body 11 is received in the insertion channel 27 of the female body 21, while being inserted through the inner sleeve 75 of the maneuvering ring 71, as shown in FIGS. 2 to 4, illustrating the successive steps of the coupling of the connection.

The male body 11, in particular its front end part 14, forms a front face 17, extending in a plane orthogonal to the axis X4. The face 17 is intended to bear against the face 62 of the closing slide valve 61 during the insertion of the male element 4 into the female element 5, to push the closing slide valve 61 back in the direction S22 relative to the female body 21 against the action of the member 66, and thus to open the passage for the fluid in the female body 21.

The face 17 advantageously surrounds the mouth of the inner pipe 15 in the direction S14, the inner pipe 15 having, from the face 17, an inner cylindrical wall 18 that extends in the direction S12. The wall 18 has a diameter D18, greater than or equal to a diameter D54 of the piston head 54, such that the wall 18 is slipped around the piston head 54 during the insertion of the male element 4 into the female element 5, as [shown] in FIG. 2.

The male body 11 has an outer radial wall 19, which extends from the face 17 in the direction S12. The wall 19 is advantageously cylindrical and has a diameter D19, which is advantageously less than or equal to the diameter D80, such that, during the insertion of the male element 4 into the female element 5, the wall 19 is received with coaxial sliding in the wall 80, as shown in FIGS. 2 to 6, the gasket 57 then advantageously providing the tightness between these walls 19 and 80.

Preferably, the male body 11 comprises a flange ring 81, centered on the axis X4, and is formed protruding outwardly, at a rear end of the wall 19, opposite the face 17.

In the front, that is to say, in the direction S14, the flange ring 81 forms an inclined surface 82, which can be described as ramp. The surface 82 advantageously begins from the rear end of the wall 19, up to a cylindrical apex wall 83 of the flange ring 81. The surface 82 extends with an increase in diameter in the direction S12. The surface 82 is preferably conical, converging toward the front of the male body, that is to say, in the direction S14. The surface 82 has an angle A82 with the axis X4, which is between 10 degrees and 50 degrees, preferably equal to 35 degrees. The surface 82 is designed to push back the locking elements 31 into the proximal position when the male element is received in the channel 27. During the insertion of the male element 4 into the female element 5, the surface 82 comes into contact with the locking elements 31, which are in the distal position, and pushes the locking elements 31 back toward their proximal position, by sliding or rolling of the locking elements on the ramp 82, as shown successively in FIGS. 2 and 3.

The cylindrical apex wall 83 is advantageously coaxial with the axis X4. The wall 83 has a diameter D83, which is preferably less than or equal to the diameters D77 and D79, while being large enough to prevent the passage of the flange ring 81 and the removal of the male element 4, while the connection is in the coupled configuration. During the insertion of the male element 4 into the female element 5, as shown in FIG. 2, the wall 83 first slides along the wall 77 of the inner sleeve 75. Next, the wall 83 reaches the locking elements 31, which have previously been pushed back into the proximal position by the wall 82. Said locking elements 31 are then temporarily kept in the proximal position by the wall 83. Next, as shown in FIGS. 3 and 4, the wall 83 slides along the wall 79 of the channel 27, where it is housed in the coupled configuration of the coupling, as shown in FIG. 4. In the coupled configuration of the coupling, the wall 82 arrives across from an inclined wall 84 of the female body 21, connecting the walls 79 and 80.

In the rear, that is to say, in the direction S12, the flange ring 81 forms an inclined surface 85, which can be described as bevel. The surface 85 advantageously begins from the rear end of the wall 83, up to a rear end of the flange ring 81. The surface 85 extends with a reduction in diameter in the direction S12. The surface 85 is preferably conical, while having an angle A85 with the axis X4, which is between 20 degrees and 70 degrees, preferably equal to 45 degrees. As shown in FIG. 4, during the insertion of the male element 4 into the female element 5, once the surface 85 has crossed the locking elements 31, the wall 85 arrives substantially at the height of the locking elements 31 and thus allows them to return to the distal position under the action of the plunger 33, moved by the return force exerted by the member 43. In this situation, if the maneuvering ring 61 is in its forward position, the inner sleeve 75 does not preclude the locking members 31 from being placed in the distal position. As shown in FIG. 4, once the locking elements 31 are in the distal position and the flange ring 81 has crossed the locking elements 31, the locking elements 31 oppose the removal of the male body 11 from the channel 27, that is to say, of the male element 4 from the female element 5, by mechanical cooperation with the surface 85. The connection is then in the coupled configuration.

The male element 4 further comprises a check valve 90, which is translatable along the axis X4 in the inner pipe 15 of the male body 11, between a forward position on the one hand, shown in FIG. 1, in which the check valve 90 closes off the inner pipe 15, while closing off the wall 18, for example owing to a peripheral sealing gasket 91 carried by the check valve 90 and inserted between the wall 18 and the check valve 90, and on the other hand a rear position, in the direction S12 relative to the forward position, shown in FIG. 4, in which the check valve 90 allows the passage of the fluid through the pipe 15. The male element 4 advantageously comprises a resilient member 92, arranged in the inner pipe 15, which exerts a return force of the check valve 90 toward its forward position, while for example bearing on an inner ring 93 of the male element 4, attached to the male body 11 in the pipe 15 in the rear part 12. As shown in FIGS. 2 to 4, during the insertion of the male element 4 into the female element 5, a front face 95 of the check valve 90 bears against the front face 56 of the piston 51, such that the piston 51 drives the check valve 90 toward its rear position and thus opens the passage for the fluid in the male body 11.

During the coupling, the opening of the slide valve 61 and the check valve 90 is advantageously simultaneous for the passage of the fluid.

In the coupled configuration of the connection, the pressure of the fluid, as well as the forces imparted by the resilient members 66 and 92, tend to push the male body 11 back outside the insertion channel 27 of the female element 5, that is to say, to move the male body 11 in the direction S12 relative to the female body 21. As a result, the male body 11 abuts in the direction S12 against the locking elements 31. Each locking element 31 is therefore inserted in compression between the surfaces 85 and the wall of its respective housing 28, while being kept against the annular stop 29 of said housing 28 by the return plunger 33, under the effect of the return force imparted by the member 43.

It is advantageously provided that the angle A85 of the surface 85 of the male body 11, relative to the axis X4, and the angle A78 of the proximal wall 78 of the inner sleeve 75 of the female element 5, relative to the axis X5, are equal while preferably being equal to 45 degrees. It is advantageously provided that the angle A85 is equal to the angle A28, these angles preferably being equal to 45 degrees. Thus, the aforementioned repulsion forces of the male element 4, or even an attempt to remove the male element 4 from the female element 5, while the connection is in the coupled configuration, does not produce additional urging of the resilient member 43, but causes the locking elements 31 to bear more against the housings 28. The bearing of each locking element 31 is done along a force axis perpendicular to the surface 85 and the housing 28 in question, which benefits the jamming of each urged locking element 31, as well as the securing of the locking of the connection in the coupled configuration. Even if the resilient member 43 is damaged, the coupling is therefore maintained. Furthermore, the resilient member 43 is less likely to wear out if the connection is mechanically urged in the coupled configuration.

In the coupled configuration of the connection, when one wishes to enter the unlocked configuration, the movement of the locking elements 31 toward the proximal position is done by the maneuvering ring 71 rather than by a withdrawal movement of the male element 4 outside the female body 5, as could have been done in the prior art. As shown in FIG.

5, an operator moves the maneuvering ring 71 toward the withdrawn position, such that the inner sleeve 75, in particular the proximal wall 78, comes into contact with the locking elements 31 to drive them toward their proximal position. When the proximal position is reached as shown in FIG. 6, the inner sleeve 75, in particular the proximal wall 78, prevents the locking elements 31 from returning to their distal position, such that the removal of the male element 4 from the female element 5 is done without driving of the locking elements 31 by the male element 4, in particular its flange ring 81. When the maneuvering ring 71 is in the withdrawn position as shown in FIG. 6, the walls 77 and 79 are practically adjacent so as to form a sliding track of the flange ring 81, in particular of its wall 83, facilitating the removal of the male element 4. The movement of the locking elements 31 for the unlocking depending on the travel of the maneuvering ring 71 and not on the travel of the male element 4, the female element 5 can be designed so as to make the travel of the male element 4 relative to the female body 21 for the locking and unlocking particularly small. The axial compactness of the female element 5 is advantageously improved as a result. Furthermore, since the maneuvering ring 71 provides the movement of the locking elements 31 toward their proximal position without participation by the male element 4, it is easier to conceive that the female element 5 is suitable for other male elements, having profiles different from that shown in the figures or including dimensional dispersions. The female element 5 is therefore particularly versatile.

When the maneuvering ring 71 is moved toward its withdrawn position by the operator during the unlocking, as shown in FIG. 5, the shoulder 89 of the ring 71 bears against the face 39 of the plunger 33 before the proximal wall 78 can bear against the locking elements 31, such that, when the proximal wall 78 bears against the locking elements 31, the bearing of the plunger 33 against the locking elements has necessarily been broken, the return force supplied by the member 43 then being transmitted to the maneuvering ring directly by the plunger 33.

The embodiment of FIGS. 7 to 10 relates to a connection that is identical to the connection of FIGS. 1 to 6, aside from the differences and particularities described below. Identical expressions and identical reference signs are used for all of the features shared by the two embodiments.

In the connection of FIGS. 7 to 10, the male element 4 is strictly identical to the male element of FIGS. 1 to 6.

Regarding the female element 5 of FIGS. 7 to 10, instead of assuming the form of a ball, each locking element 31 assumes the form of a cylindrical roller, which is coaxial to the movement axis X28. In the embodiment of FIGS. 7 to 10, only three locking elements 31 provided, housed in three respective housings 28 of the female body 21.

Figure 7:
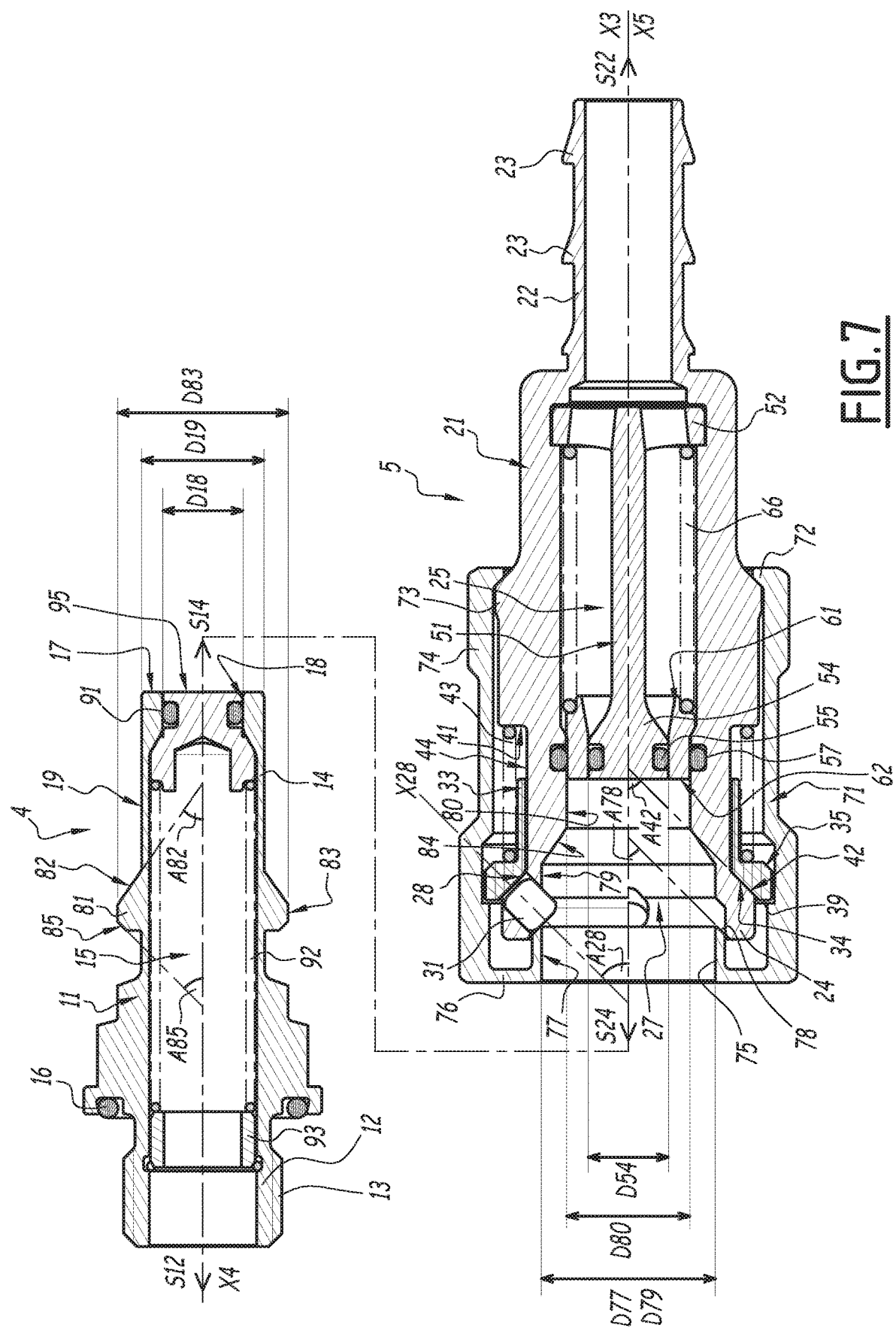
FIG. 7 is a view similar to FIG. 1 of a connection according to a second embodiment according to the invention, the connection being in an uncoupled configuration.
Figure 8:
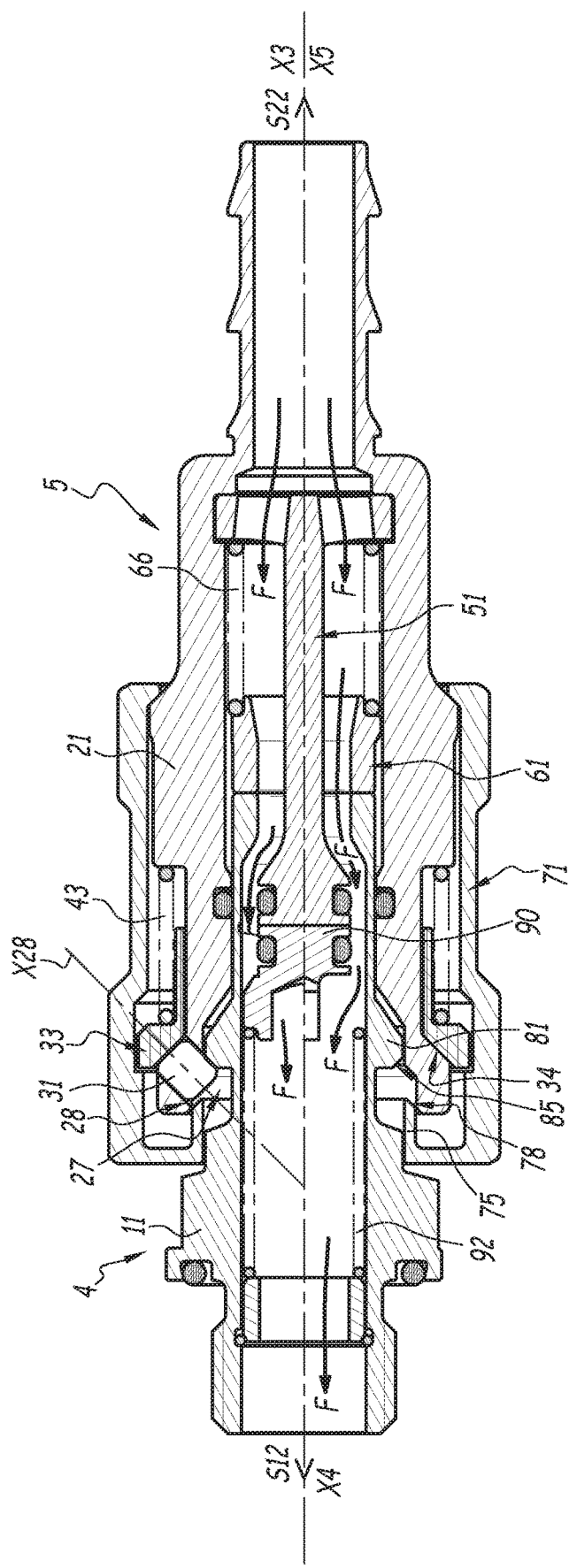
FIG. 8 is a view similar to FIG. 4, of the connection of FIG. 7, in a coupled configuration.

In the connection of FIGS. 7 to 10, each housing 28 has a cylindrical shape around coaxial to [sic] the axis X28 over its entire length, with of constant diameter. In particular, the housings 28 do not comprise the annular stops 29 present for the connection of FIGS. 1 to 6, or a pierced bottom. Each housing 28 is therefore easier to manufacture. In the embodiment of FIGS. 7 to 10, the stop of the locking elements 31 in the direction S24, in the distal position, is provided by the proximal wall 78 of the inner sleeve 75, as shown in FIGS. 7 and 8, but is not provided by the housings 28 themselves, which do not limit the movement of the elements 31 in this direction. When the maneuvering ring 71 is in the forward position and the locking elements 31 are in the distal position, the locking elements 31 can travel along their respective axis X28 between the proximal wall 78 and the inclined front face 34 of the plunger 33, which are spaced apart by a distance greater than or equal to the minimum distance d34, measured along the axis X28, which is greater than the respective length of the locking elements 31, measured along their respective axis X28.

In the coupled configuration of the connection, as shown in FIG. 8, the proximal wall 78 and the inclined front face 34 still being at a distance greater than or equal to the minimum distance d34, a movement of the locking elements 34 relative to the female body 21 along their axis X28 is theoretically possible. However, the locking elements 31 are inserted, along an axis perpendicular to their respective axis X28, between the wall of their respective housing 28 and the surface 85 formed on the flange ring 81 of the male body 11, such that each locking element 31, by adherence, is immobilized in its housing 28 along the axis X28, in an undetermined position between the proximal wall 78 and the inclined front face 34, under the effect of the repulsion force caused by the pressure of the fluid or the resilient members 66 and 92.

In the coupled configuration, providing that the locking elements 31 are rollers rather than balls makes it possible for the locking elements 31 to absorb greater forces, in particular better resistance of the rollers to burring by distribution of the stresses over a linear bearing rather than a periodic bearing specific to the balls. It is thus possible to use the connection even if the fluid pressure circulating in the connection is especially high and/or even if the connection is mechanically highly urged from the outside. Alternatively, at equal mechanical strength, it is possible to provide that the number of locking elements 31 is lower, if rollers are provided rather than balls. This facilitates the manufacturing, in particular to produce through housings 28.

Figure 9:
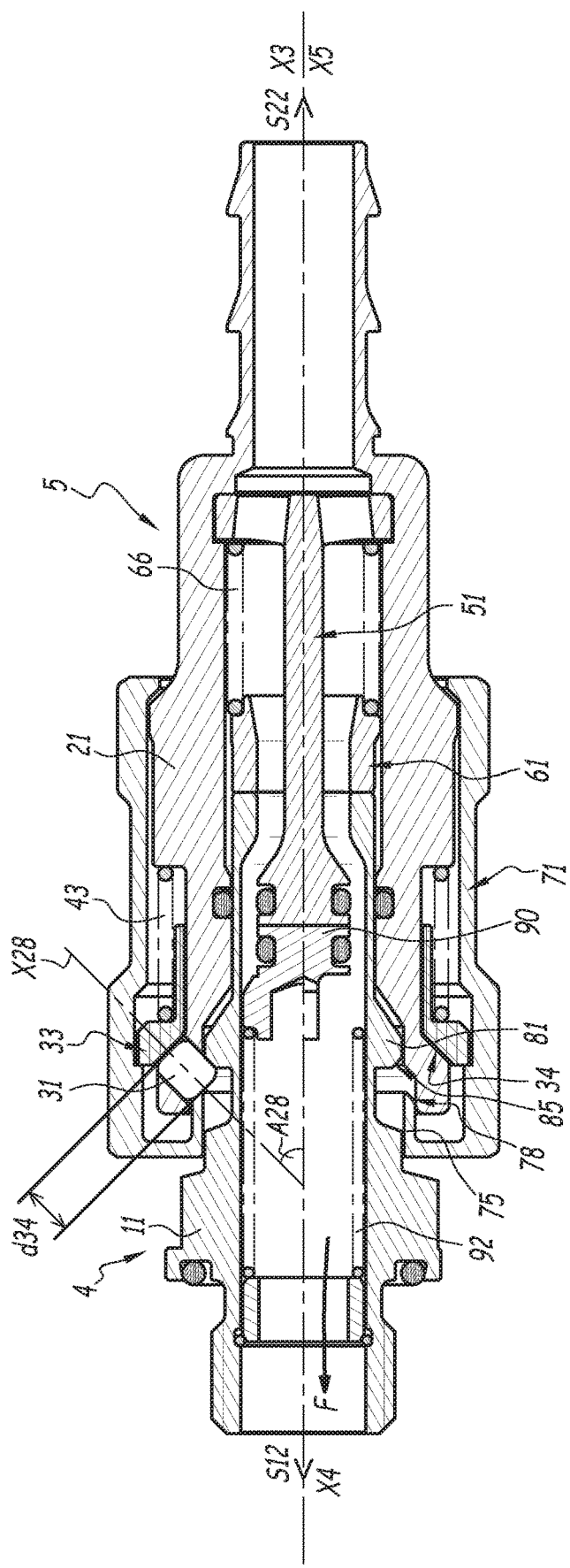
FIG. 9 is a view similar to FIG. 5, where the connection of FIG. 7 is in a first stage of uncoupling.

FIG. 9 corresponds to a situation similar to FIG. 5, where the maneuvering ring 71, moved toward its withdrawn position, bears in the direction S22 against the elements 31, after having initiated the bearing that the plunger 33 exerts against the elements 31. In this situation, the return force imparted by the resilient member 43 no longer applies on the elements 31, but on the ring 71.

Figure 10:
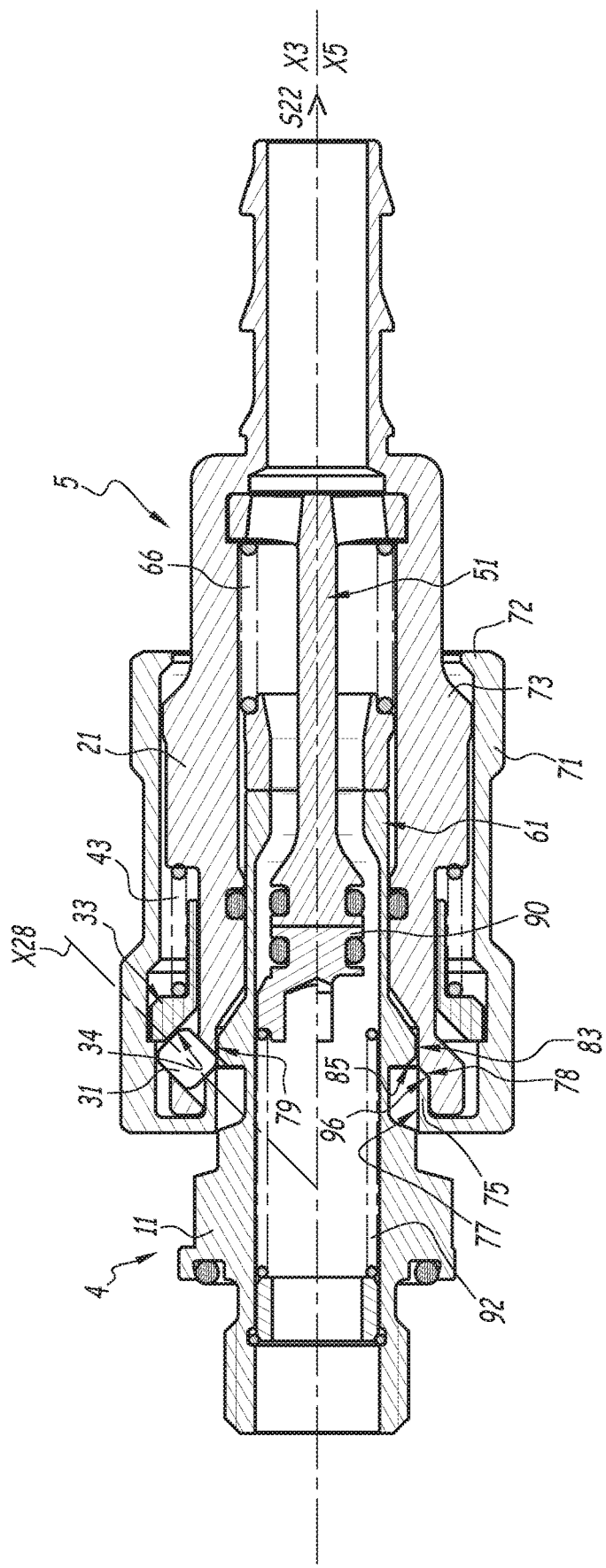
FIG. 10 is a view similar to FIG. 6, where the connection of FIG. 7 is in a second stage of uncoupling successive to the first stage of uncoupling.

Unlike the embodiment of FIGS. 1 to 6, in the embodiment of FIGS. 7 to 10, in the withdrawn position, the maneuvering ring 71 abuts against the female body 21 in the direction S22, in particular by axial abutment of the proximal wall 78 of the inner shoulder 75 against a distal wall 96 of the female body 21, which partially delimits the insertion channel 21, axially at the same level as the mouth of the housings 28 in the insertion channel 21. This abutment of the maneuvering ring 71 is shown in FIG. 10.

In a variant, the male body 11 has an outer profile different from that shown in the figures. For example, the surfaces 82 and 85 are not formed on a flange ring and/or extend over only a portion of the circumference.

In a variant, the body 11 and/or the body 21 and/or the ring 74 are not monolithic. In particular, the body 21 can be made in two or three parts along the axis X5, in particular to facilitate the assembly of the parts received in the inner pipe 25.

In a variant, the number of locking elements 31, and corresponding housings 28, is different from three or six, while preferably being greater than or equal to three.

Any feature described above for one embodiment or variant applies to the other embodiments and variants described above, as long as it is technically possible to do so.

The invention claimed is:

1. A female element, for a fluid connection designed for joining pressurized fluid lines, the female element being configured to be coupled with a complementary male element, belonging to the fluid connection, the female element comprising:
- a female body, defining an insertion channel of the male element, the insertion channel defining a central axis of the female body;
- locking elements, which are received in respective housings arranged in the thickness of the female body, each housing being inclined relative to the central axis and emerging in the insertion channel, each locking element being movable relative to the female body, between a distal position, in which said locking element protrudes radially into the insertion channel, and a proximal position, in which said locking element is withdrawn from the insertion channel; and
- a maneuvering ring, which surrounds the female body and which is translatable relative to the female body along the central axis, between a forward position and a withdrawn position, the maneuvering ring comprising an inner sleeve that is at least partially received in the insertion channel, the inner sleeve being configured to:
  - drive the locking elements to their proximal position, when the maneuvering ring is moved from its forward position to its withdrawn position,
  - prevent the locking elements from adopting their distal position when the maneuvering ring is in the withdrawn position, and
  - allow the locking elements to adopt their distal position when the maneuvering ring is in the forward position;

wherein:
- the female element further comprises:
  - a return plunger, which is inserted radially between the maneuvering ring and the female body, which is movable relative to the female body and which is intended to return the locking elements toward their distal position, the return plunger being movable between a forward position, in which the locking elements are in their distal position, and a rear position, in which the return plunger leaves the locking elements freely movable between their distal position and their proximal position, and
  - a resilient member, which exerts a return force tending to return the return plunger toward its forward position; and
- the maneuvering ring is configured to drive the return plunger toward its rear position, such that the return plunger does not exert any return force on the locking elements when the maneuvering ring is moved from its forward position toward its withdrawn position.

2. The female element according to claim 1, wherein the maneuvering ring is configured to drive the return plunger toward its rear position, away from the locking elements, when the maneuvering ring is moved from its forward position toward its withdrawn position.

3. The female element according to claim 1, wherein the return plunger is a return ring that is translatable relative to the female body, along the central axis, and designed to return the locking elements toward their distal position under the action of the return force when the return ring bears against the locking elements.

4. The female element according to claim 1, wherein the female body constitutes a stop of the return plunger in its forward position.

5. The female element according to claim 1, wherein:
- the inner sleeve comprises a proximal wall, by means of which the inner sleeve drives the locking elements from their distal position to their proximal position, when the maneuvering ring is moved from its forward position to its withdrawn position;
- the return plunger comprises an inclined front face, by means of which the return plunger is able to abut against the locking elements; and
- the inclined front face or the proximal wall is kept at a distance from the locking elements, so as to allow a movement of the locking elements between the inclined front face and the proximal wall when the maneuvering ring is moved from its forward position to its withdrawn position.

6. The female element according to claim 5, wherein the proximal wall is inclined relative to the central axis, by an angle of between 20 degrees and 70 degrees.

7. The female element according to claim 1, wherein each locking element is movable between its proximal position and its distal position along a respective movement axis, which is inclined relative to the central axis, by an angle between 20 degrees and 70 degrees.

8. The female element according to claim 1, wherein, the locking elements bear on the inner sleeve, when the locking elements are in the distal position.

9. The female element according to claim 1, wherein, each locking element bears on a respective annular stop of the female body, when said locking element is in the distal position.

10. The female element according to claim 1, wherein the return plunger is configured to bear against the maneuvering ring, the return plunger tending to return the maneuvering ring toward the forward position under the action of the return force, when the return plunger bears against the maneuvering ring.

11. The female element according to claim 1, wherein:
- the inner sleeve forms a front inner wall, of cylindrical shape centered on the central axis;
- the female body forms a rear inner wall, delimiting a part of the insertion channel, the rear inner wall being of cylindrical shape centered on the central axis; and
- the front inner wall and the rear inner wall are of equal diameter and are arranged in the extension of one another.

12. The female element according to claim 1, wherein each locking element is formed by a respective ball.

13. The female element according to claim 1, wherein each locking element is formed by a respective cylindrical roller.

14. The female element according to claim 1, wherein the female element comprises:
- a central piston, arranged inside the insertion channel while being stationary with respect to the female body, the central piston having a first front face; and
- a closing slide valve, radially inserted between the insertion channel and the central piston, while being movable relative to the female body between a forward position, in which the closing slide valve fluidly closes the insertion channel, and a withdrawn position, in which the closing slide valve fluidly frees the insertion channel, the closing slide valve having a second front face, the first front face and the second front face extending in a same plane perpendicular to the central axis when the closing slide valve is in the forward position.

15. A fluid connection, designed to join pressurized fluid lines, the fluid connection comprising a female element according to claim 1 and the complementary male element, the male element comprising a male body that is able to be received in the insertion channel of the female body through the inner sleeve, to push the locking elements into their proximal position when the male body is received in the insertion channel, and to cooperate with the locking elements when the locking elements are in the distal position, to prevent the axial removal of the male body from the insertion channel.

16. The fluid connection according to claim 15, wherein the male body comprises a first surface, able to push the locking elements back into their proximal position when the male element is received in the insertion channel of the female body.

17. The fluid connection according to claim 16, wherein the first surface has a conical shape converging toward the front of the male element.

18. The fluid connection according to claim 16, wherein the male body comprises a second surface, able to cooperate with the locking elements while the locking elements are in the distal position, to prevent the axial removal of the male body from the insertion channel, wherein the male body comprises a flange ring, the first surface being formed in front of the flange ring, the second surface being formed behind the flange ring.

19. The fluid connection according to claim 15, wherein the male body comprises a second surface, able to cooperate with the locking elements, while the locking elements are in the distal position, to prevent the axial removal of the male body from the insertion channel.

20. The fluid connection according to claim 19, wherein the second surface is inclined by an angle of between 20 and 70 degrees relative to a central axis of the male element defined along the male body, the central axis of the male element and the central axis of the female element being coaxial when the male body is received in the insertion channel of the female body.

21. The fluid connection according to claim 19, wherein:
the inner sleeve comprises a proximal wall, by means of which the inner sleeve drives the locking elements from their distal position to their proximal position, when the maneuvering ring is moved from its forward position to its withdrawn position;
the return plunger comprises an inclined front face, by means of which the return plunger is able to abut against the locking elements; and
the inclined front face or the proximal wall is kept at a distance from the locking elements, so as to allow a movement of the locking elements between the inclined front face and the proximal wall when the maneuvering ring is moved from its forward position to its withdrawn position,
wherein the second surface of the male body and the proximal wall of the inner sleeve of the female element are inclined relative to the central axis of their respective male or female element, by an equal angle.

* * * * *